June 7, 1932.  J. S. CUTHBERTSON  1,862,368
AIR VALVE
Filed Dec. 17, 1929
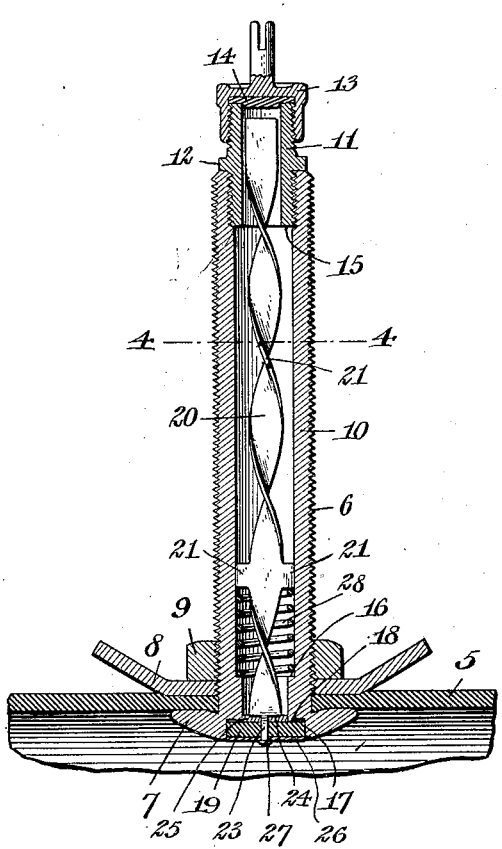
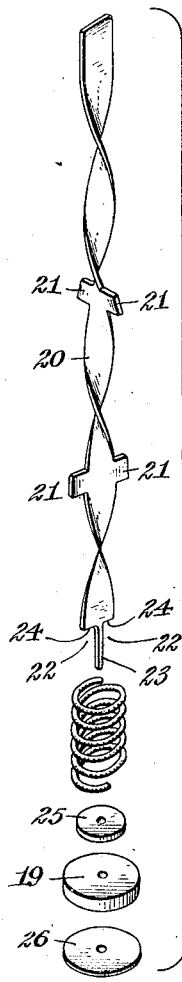
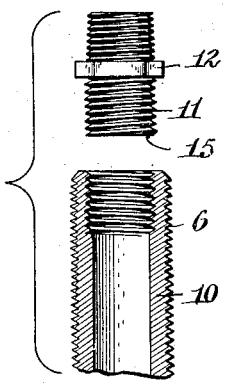
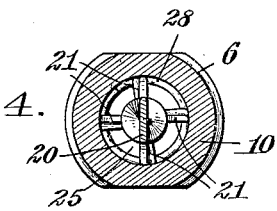
John S. Cuthbertson, Inventor.
By Emil Neuhart
Attorney.
Witness:
J. J. Oberst, Patented June 7, 1932

1,862,368

UNITED STATES PATENT OFFICE

JOHN S. CUTHBERTSON, OF BUFFALO, NEW YORK, ASSIGNOR, BY DIRECT AND MESNE ASSIGNMENTS, OF TWO-THIRDS TO FRANK H. DEAGAN, OF BUFFALO, NEW YORK, AND ONE-THIRD TO JOHN H. HIFLER, OF TONAWANDA, NEW YORK

AIR VALVE

Application filed December 17, 1929. Serial No. 414,793.

My invention relates to improvements in air-valves for air-inflatable objects, and particularly to valves adapted for use in connection with pneumatic tires.

The primary object of my invention is the provision of an air-valve of simple construction, and in which the use of small delicate parts is obviated.

Another object of my invention is to provide an improved air-valve of this type in which the valve proper is located at the inner end of the valve structure and adapted to be opened into the tire, or more particularly into the inner tube of the tire, so that a comparatively wide passage can be provided in the valve tube or casing, enabling the tire to be blown up more speedily, and also to be deflated within a shorter period of time than permitted with present-day valve structures for this purpose.

A further object of my invention is the provision of an air-valve so constructed that in the event of foreign matter lodging within the valve tube or casing, such matter can be easily loosened and ejected by permitting air to be exhausted from the inner tube of the tire.

With the above and other objects to appear hereinafter, this invention consists in the novel features of construction and in the arrangement and combination of parts to be hereinafter described and more particularly set out in the appended claims.

In the drawing:

Fig. 1 is a longitudinal section through an air valve embodying my invention; the same being shown fastened to the wall of an inner tube of an automobile tire.

Fig. 2 is a disassembled view of the two parts of the valve tube or casing.

Fig. 3 is a disassembled view of the interior or movable parts of the valve structure.

Fig. 4 is an enlarged horizontal section taken on line 4—4, Fig. 1.

The reference numeral 5 designates a portion of an inner tube of an automobile tire, the tube having an opening formed in its wall in the usual way, through which the valve tube or casing 6 is passed. Said valve tube or casing is elongated and preferably of a diameter somewhat larger than the conventional valve tube or casing. It is provided at its inner end with a circumferential flange 7 over which the wall of the inner or tire tube 5 is stretched when attaching the valve tube or casing to said tire tube, so that said flange bears against the inner side of said tube, while the adjacent portion of the valve tube or casing is surrounded by the stretchable wall of the inner or tire tube of the automobile tire. This results in the valve tube or casing extending outwardly from the inner or tire tube and being held firmly in place by the usual clamp member 8 and nut 9.

The valve tube or casing 6 may be formed in one piece, but I have shown the same formed of two members 10, 11; member 11 being of smaller diameter than member 10 and it is threaded into the outer end of member 10; and to permit of this, member 11 is provided with a hexagonal flange 12 so that it can be conveniently tightened with a wrench or other suitable tool.

A sealing cap 13 of conventional size is applied to the outer end of member 11, which may be termed the outer member or adapter, and this cap has the usual washer 14, which bears against the outer edge of said outer member or adapter.

Member 10, which may be termed the main member, is screw-threaded from a point near the circumferential flange 7 to its outer end, so that the clamp member and nut can be threaded thereon.

The bore of or passage through the valve tube or casing, considering the adapter to form part thereof is of different diameters from end to end; the outer end of this bore or passage being reduced by the use of the adapter to form an inwardly-facing shoulder 15, while the inner end is reduced to form an outwardly-facing shoulder 16; the tube or casing being otherwise of even diameter from shoulder to shoulder.

The inner end of member 10 is counterbored, as at 17, to provide an inwardly-facing valve seat 18, against which a valve 19 is seated, and from which valve extends my improved valve stem 20; broadly considered, a valve carrier.

The valve is of disk-like formation and constructed of fiber or any other suitable material, while the valve stem is made of a strip or ribbon of metal twisted and provided at intervals along its length with projecting ears 21; the ears being arranged in pairs and the ears of each pair being preferably in the same transverse plane. The ears of the valve stem lie in sliding contact with the wall of the tube; thus the valve stem is centered and guided for longitudinal movement within the valve tube or casing. The twisted portions of the valve stem between the two pairs of ears, and above and beneath the same, are of considerably smaller cross sectional dimension than the diameter of the bore of said valve tube or casing, except where the upper end of said stem enters the outer member or adapter 11, where a sliding fit may be provided between the opposite edges of the stem and the wall of said member, and where the lower end of the stem passes through the reduced lower end of said bore, where somewhat smaller spaces are provided between the edges of said stem and the wall of said tube or casing. Owing to the fact that the cross dimension of the valve stem taken through the ears 21 is greater than the opening through the outer member or adapter 11, it will be apparent that the inwardly-facing shoulder 15 at the upper end of the valve tube or casing must, in the specific construction shown, be formed by a detachable element; otherwise it would be impossible to insert the valve stem into said valve tube or casing.

The lower end of the valve stem is reduced transversely from opposite edges, as at 22, to form a central stud 23 and two inwardly-facing shoulders 24. Onto the stud 23, a combined washer and guide 25 is positioned which bears against the shoulders 24, and when the tire is inflated, this combined washer or guide is positioned within the reduced lower portion of the bore within the valve tube or casing, as clearly shown in Fig. 1. The valve 19 is also placed on said stud and lies against the combined guide and washer 25, while the retainer disk 26 is placed over the stud 23 in contact with the inner face of the valve 19; the end of the stud projecting beyond the outer face of the retainer disk 26 and being upset, as at 27, to fasten the valve to the valve stem.

Surrounding the lower twisted portion of the valve stem is a helical compression spring 28, the outer end of which bears against the inner or innermost pair of studs 21 on said valve stem, as the case may be, which serve as a spring-abutment, while the inner end thereof bears against the outwardly-facing shoulder 16 at the inner end of the bore of said valve tube or casing.

It will be apparent that a comparatively large valve is provided by reason of its location at the inner end of the valve tube or casing, since its seat is formed in a region of the valve casing enlarged by the flange 7. The air within the tube of the valve therefore exerts its pressure over a considerable area of the mechanism provided for closing the air passage through the valve tube or casing, and the circumference of the valve seat is also considerably larger than provided in the present-day constructions. Moreover, an air passage of comparatively large dimension is provided with comparatively little obstruction to offer resistance to the air passing through the passage, and the parts within the passage are reduced to the minimum and are comparatively large and substantial.

Dust caps fitting over the portions of the valve tubes or casings extending through the rims of automobile wheels are now dispensed with, and carelessness in leaving off the sealing caps of the valve tubes or casings when inflating tires, or a loss of the caps from the tubes or casings as commonly occurs, permits the entrance of grit, water, soil, and other foreign matter into the tube or casing, with the result that the delicate valve mechanism now employed, becomes useless; there being no way in which this foreign matter can be removed from the tube or casing, except to remove the valve mechanism from the casing. Under like conditions, grit and foreign matter entering the tube or casing constructed in accordance with this invention would not, on account of the comparatively large size of the parts of the mechanism, impair the effectiveness of the same and unless the tube or casing became entirely clogged, the movable parts thereof would retain their efficiency.

By the use of a detachable adapter applied to the outer end of member 10, or the main portion of the valve tube or casing, comparatively large air control mechanism may be employed within the tube or casing and parts of this mechanism may be larger in transverse dimensions than the passage through said adapter. This is a decided advantage in that it enables the employment of a comparatively rigid valve stem which, when twisted, will enable the valve stem to be rotated with a view of loosening any foreign matter having lodged within the valve tube or casing, especially in the event that the cap becomes accidentally lost.

While I have referred to the valve tube or casing being preferably enlarged it is, of course, understood that such tube or casing may be of conventional size, since in that case it would still permit the use of a comparatively large and rigid valve stem and a comparatively long and effective spring surrounding the stem.

In the event of clogging, due to excessive accumulation of foreign matter in the valve tube, it is simply necessary to use a suitable tool, such as the slotted outer end of a sealing cap, and engage the upper end of the valve stem so as to rotate the same. The ears 21 of said valve stem would loosen any matter adhering to the wall of the tube or casing and break down any packed substance formed on said wall or casing, while the twisted portion of the valve stem between said ears and above and beneath the same, would act to more efficiently loosen foreign matter lodging in the tube or casing. Matter so lodged, when broken up in this manner, can be forced out of the tube or casing by depressing the valve, whereupon the air under pressure within the tube will act on the foreign matter and cause complete ejection of the same from the tube or casing.

By reason of the valve being located at the lower end of the tube or casing and directly within the inflatable tube of the tire, a comparatively large valve stem can be employed, in addition to a large size valve of greater diameter than the diameter of the bore or passage through the tube. The valve used in accordance with this invention is considerably enlarged over present forms of valves and consequently permits the use of a comparatively long and strong spring; all of which will result in long life for the complete valve structure and high and lasting efficiency in its sealing qualities.

Having thus described my invention, what I claim is:—

1. An air valve, comprising an elongated casing having a valve seat at its inner end, a valve bearing against said seat, and a valve stem extending from said valve into said casing, said valve stem being formed of a flat twisted metallic strip.

2. An air valve, comprising an elongated casing having a valve seat at its inner end, a valve bearing against said seat, and a valve stem extending from said valve into said casing, said valve stem being formed of a flat twisted metallic strip provided at opposite edges with oppositely-extending ears.

In testimony whereof, I affix my signature.

JOHN S. CUTHBERTSON.